(12) United States Patent
Shimizu et al.

(10) Patent No.: US 8,743,299 B2
(45) Date of Patent: Jun. 3, 2014

(54) THREE-PLATE TYPE OF LIQUID CRYSTAL PROJECTOR USING PROJECTION DISPLAY APPARATUS

(75) Inventors: Shigeo Shimizu, Kanagawa-ken (JP); Tatsuya Mukouyama, Kanagawa-ken (JP)

(73) Assignee: JVC Kenwood Corporation, Kanagawa (JP)

( * ) Notice: Subject to any disclaimer, the term of this patent is extended or adjusted under 35 U.S.C. 154(b) by 0 days.

(21) Appl. No.: 12/907,318

(22) Filed: Oct. 19, 2010

(65) Prior Publication Data

US 2011/0032436 A1 Feb. 10, 2011

Related U.S. Application Data (62) Division of application No. 11/540,685, filed on Oct. 2, 2006, now abandoned.

(30) Foreign Application Priority Data

Oct. 3, 2005 (JP) ................................. 2005-289476

(51) Int. Cl.
*G02F 1/1335* (2006.01)
(52) U.S. Cl.
USPC ...................................... 349/9; 349/5; 349/8
(58) Field of Classification Search
USPC ....................................................... 349/5–10
See application file for complete search history.

(56) References Cited

U.S. PATENT DOCUMENTS

| | | | |
|---|---|---|---|
| 6,857,747 B2 | 2/2005 | Pentico et al. | |
| 6,900,866 B2* | 5/2005 | Kurtz et al. | 349/117 |
| 7,352,416 B2* | 4/2008 | Hirota et al. | 349/5 |
| 2003/0128320 A1 | 7/2003 | Mi et al. | |
| 2003/0164909 A1 | 9/2003 | Shimizu | |
| 2005/0073618 A1* | 4/2005 | Hashimoto | 349/5 |
| 2006/0007379 A1* | 1/2006 | Vithana | 349/130 |
| 2006/0203164 A1* | 9/2006 | Silverstein et al. | 349/117 |
| 2007/0064163 A1* | 3/2007 | Tan et al. | 349/5 |

FOREIGN PATENT DOCUMENTS

JP 2002-098937 4/2002

* cited by examiner

*Primary Examiner* — Bumsuk Won
*Assistant Examiner* — Charles Chang
(74) *Attorney, Agent, or Firm* — Clark & Brody (57) ABSTRACT

A projection display apparatus comprises a reflective LC display device and a polarizing beam splitter having a polarizing separative plane and wired grids. The LC molecules of the device are aligned such that i) a segment on a second subtracted, produced by projecting a major axis of each LC molecule perpendicularly onto the second substrate, makes an angle of 42 to 48 degrees counterclockwise or counterclockwise in relation to a direction of a straight line on the second substrate, formed by projecting each wire grid perpendicularly onto the second substrate and ii) of both ends of the segment, one end meeting an end of each LC molecule, which is positioned nearer to the second substrate than the other end, is positioned nearer to an intersection at which a plane including the polarizing separative plane and a plane including the second substrate mutually intersects, than the other end of the segment.

5 Claims, 10 Drawing Sheets

THREE-PLATE TYPE OF LIQUID CRYSTAL PROJECTOR USING PROJECTION DISPLAY APPARATUS

CROSS REFERENCE TO RELATED APPLICATION

The present application relates to and incorporates by reference Japanese Patent application No. 2005-289476 filed on Oct. 3, 2005.

BACKGROUND OF THE INVENTION

1. Field of the Invention

The present invention relates to a projection display apparatus equipped with reflective liquid crystal (LC) display devices and a three-plate type of liquid crystal projector that uses the projection display apparatus as for modulating each monochromatic light.

2. Description of the Related Art

In recent years, liquid crystal projectors have been incorporated into popular tools that can be used as large-sized screen display apparatuses. Such display apparatuses, which can be used for various things, such as meetings with screen presentation, home theaters, and other uses, have been developed on various types of display techniques.

In particular, a projection display apparatus which processes respective monochromatic light channels for the primary colors adopts reflective liquid crystal display devices.

Each reflective liquid crystal device has two substrates and a liquid crystal layer, where one substrate has a surface with a transparent electrode formed thereon and the other substrate has a surface on which reflective electrodes and drive circuits for respective pixels are arranged in a matrix and both surfaces of the two substrates are opposed in parallel to each other to sandwich the liquid crystal therebetween as a layer. In this display device, the drive circuits for the liquid crystal can be embedded beneath the display pixels, thus allowing the projection display apparatus to present images with high spatial resolution and high brightness.

The liquid crystal display devices utilize the double refraction of liquid crystal molecules to control the transmission of the light passing therethrough. Thus how to orient the liquid crystal molecules has a large influence on the display quality of the images. In such situations, a vertically aligned type of liquid crystal (on homeotropic aligned mode) has attracted attentions, because this type of liquid crystal provides high contrast and has a faster response time than a horizontally aligned type of liquid crystal (on homogeneous aligned mode).

In the horizontally aligned type of liquid crystal, the liquid crystal molecules are aligned almost in parallel with the substrate plates when no voltage is applied between the substrates, while the molecules are aligned perpendicularly to the substrate surfaces thanks to their dielectric anisotropy in response to application of the voltage therebetween, whereby the black-and-white display can be realized. However, in the perpendicularly aligned state, some molecules closely positioned to alignment membranes on the respective substrates are still kept at alignment angles which are close to the horizon, thus deteriorating a black level due to retardation to be caused (i.e., the contrast is obliged to be lowered). By contrast, the vertically aligned type of liquid crystal has a negative dielectric anisotropy, so that even no application of voltage between the substrates permits the liquid crystal molecules to be aligned almost perpendicularly to the substrates, whilst applying the voltage therebetween allows the molecules to be aligned in parallel with the substrates. This makes the contrast high and makes it possible to operate the molecules faster with less driving power.

Figure 11:
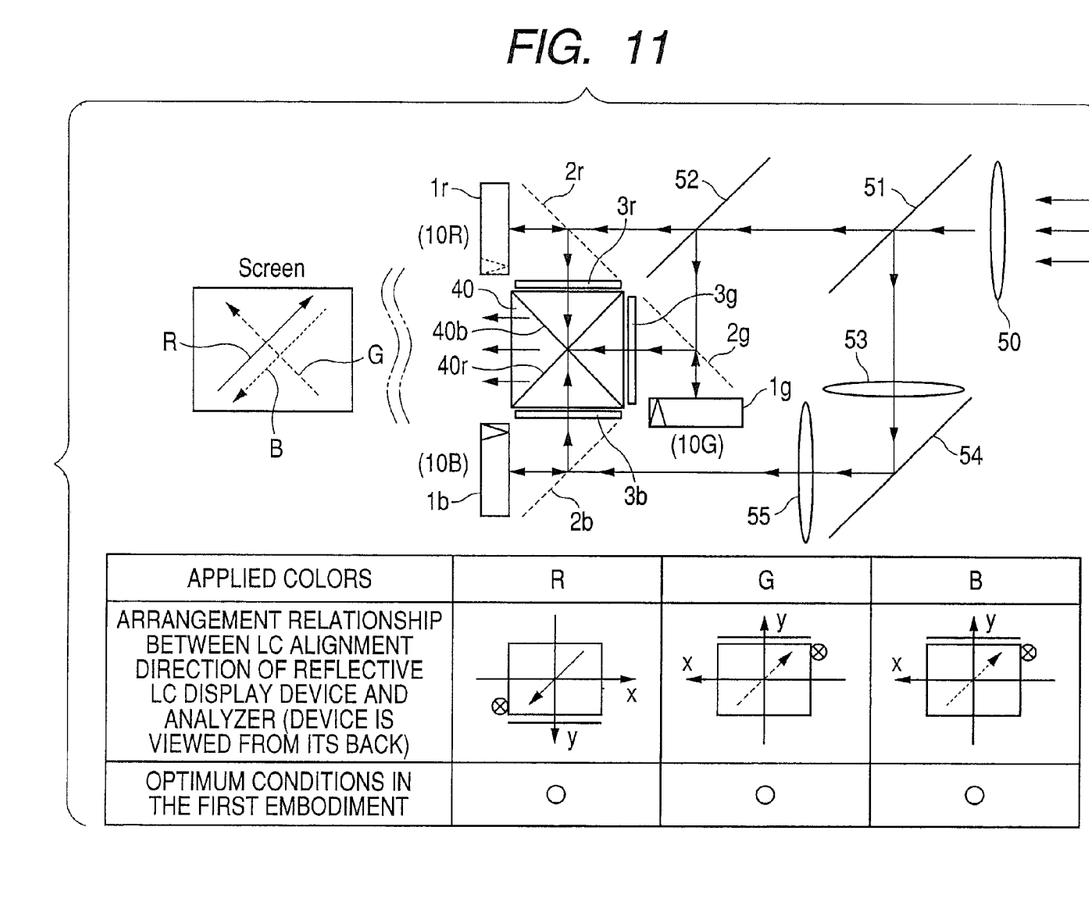
FIG. 11 is an optical path view and an illustration according to the three-type of liquid crystal projector according to the third embodiment.
Figure 13:
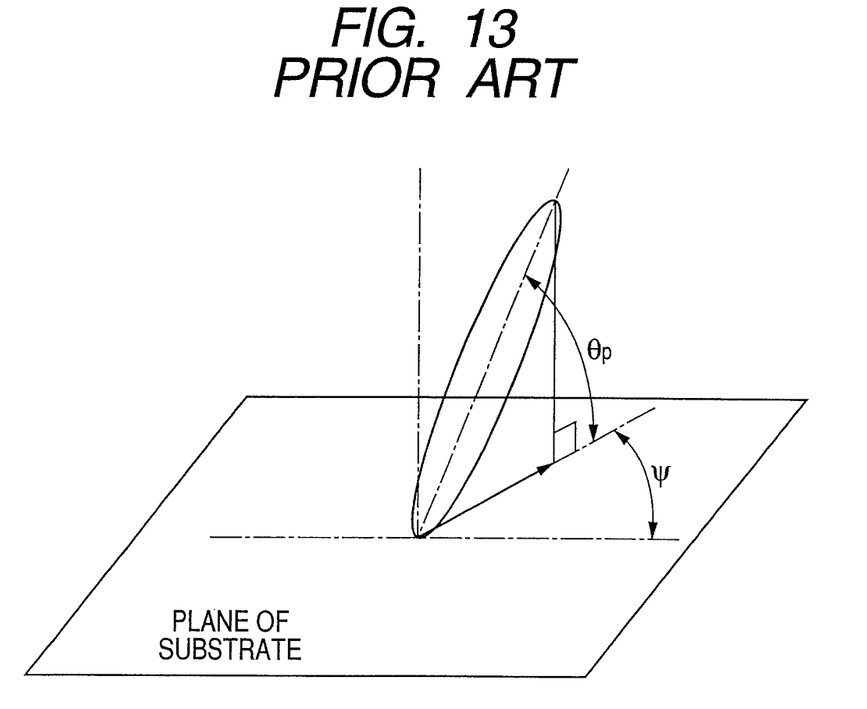
FIG. 13 is a vectorial view an aligned state of a vertically aligned type of liquid crystal layer in a no-voltage applied state.

There is one thing, however, that should be noted when the vertically aligned type of liquid crystal is used. Namely, this will be caused when the voltage is applied in a state where the alignment is completed such that the liquid crystal molecules are completely perpendicular to the substrate surfaces in response to the voltage non-application. That is, the liquid crystal molecules fall down in different various directions by responding to the voltage application, bringing about disclination which deteriorates image quality. To suppress this drawback, as shown in FIG. 11, the vertically aligned type of liquid crystal is subjected to have a pre-tilt angle θp to allow the molecules to keep a slight inclination in a predetermined direction during non-application of the voltage between the substrates. In FIG. 13, an angle ψ is an azimuthal angle made between a predetermined axis direction on the substrate surface(s) and a projected direction of the major axis of the liquid crystal molecule onto the substrate surface(s).

It is also known that, in the projection display apparatus, the reflective liquid crystal display device can be equipped with not only the reflective liquid crystal display device including the vertically aligned type of liquid crystal but also a wire grid type of polarizing beam splitter (hereinafter referred to as "WG-PBS") serving as an incident and reflecting optical system for polarized light entering or coming out of the display device. This structure is able to provide projection images with very high contrast (refer to for example United States Patent Laid-open Publication No. 2003/0128320). In a reflective liquid crystal display device shown in this publication, alignment membranes are placed on surfaces of both a transparent substrate and an active matrix substrate so as to be exposed to liquid crystal sandwiched between the substrates as a layer. Using those membranes, the molecules of the liquid crystal layer are given the alignment conditions (i.e., pre-tilt angle θp and azimuthal angle ψ) illustrated in FIG. 13.

In this alignment, the pre-tilt angle θp is given to the liquid crystal molecules, thus causing retardation more or less in the plane direction of the liquid crystal layer, decreasing the contrast.

To avoid this drawback, a countermeasure is known which is to employ a phase compensator (e.g., phase compensating plate) to compensate for differences in the phase of reflected light. This compensator is placed on the polarized-light incident and outgoing side of a reflective liquid crystal display device. United States Patent Laid-open Publication No. 2003/0164909 discloses the relationship between angles of a late-phase axis of a phase compensator and the azimuthal angles of liquid crystal molecules.

On the other hand, the foregoing projection display apparatus with the foregoing configuration can be applied to a single-color light processor, as one of the three processors for the three primary colors, of a three-plate type of liquid crystal projector. With regard to this projector, various proposals, such as U.S. Pat. No. 6,857,747 and Japanese Patent Laid-open Publication No. 2002-098937, have known.

As stated so far, it has been known that the projection display apparatus is able to provide images of higher contrast if the apparatus is produced by using not merely the reflective liquid crystal display device with the vertically aligned type of liquid crystal but also the WG-PBS to be combined with the display device. However, it is admitted to the inventors that alignment conditions for liquid crystal molecules have yet to be disclosed by anybody. In particular, it is absolutely necessary for the projection display apparatus that the bright state (the liquid crystal molecules are flipped down due to a voltage application) outputs a high brightness and the dark state outputs the lowest brightness to the best of apparatus's ability. If such bright and dark states are produced, high contrast can be given to images. However, optimum alignment conditions for producing those two states have been unknown yet.

SUMMARY OF THE INVENTION

The present invention has been made in consideration of the foregoing difficulties, and an object of the present invention is to provide a projection display apparatus capable of image of higher contrast by giving optimum conditions to alignment of liquid crystal and a phase compensator. Another object of the present invention is to provide reasonable application conditions in employing the foregoing projection display apparatus in a three-plate type of liquid crystal projector.

In order to realize the above object, as one aspect, the present invention provides a projection display apparatus comprising: a reflective liquid crystal display device comprising i) a first substrate having a surface on which a transparent electrode is formed; ii) a second substrate being disposed in parallel to the second substrate with a space left between the first and second electrodes, having thereon a matrix formation composed of reflective electrodes and drive circuits for respective pixels; and iii) a liquid crystal layer composed of nematic liquid crystal having negative dielectric anisotropy and held in the space between the first and second substrates, the liquid crystal composed of liquid crystal molecules to which a pre-tilt angle is given; a polarizing beam splitter comprising i) a polarizing separative plane positioned obliquely to the first substrate and ii) a wire grid formed on the polarizing separative plane and being in parallel to the first substrate, whereby the polarizing beam splitter allows only a first polarized light component of incident illuminating light to be transmitted therethrough so as to perpendicularly enter the reflective liquid crystal display device and allows a second polarized light component, which is opposite to the first polarized light component, of reflected modulated light emitted from the reflective liquid crystal device to be reflected therefrom so as to produce light to be projected, wherein the liquid crystal molecules are aligned such that i) a segment on the second subtracted, produced by projecting a major axis of each liquid crystal molecule perpendicularly onto the second substrate, makes an angle of 42 to 48 degrees counterclockwise or counterclockwise in relation to a direction of a straight line on the second substrate, formed by projecting the wire grid perpendicularly onto the second substrate and ii) of both ends of segment, an end which meets a one end of each liquid crystal molecule, which is positioned nearer to the second substrate than the other end of each liquid crystal molecule, is positioned nearer to an intersection at which a plane including the polarizing separative plane and a plane including the second substrate intersects with each other, than the other end of the segment.

In the reflective liquid crystal display device, it has been understood that the condition giving the maximum output (brightness) in the bright state results in an angle of 45 degrees made between the direction of segments produced by liquid crystal molecules on the substrate plane and the oscillation direction of incident polarized light. In this case, however, in a case where a pre-tilt angle is given to the liquid crystal molecules, the maximum output in the bright state is limited to four conditions consisting of 45, 135, 225 and 315 degrees as azimuthal angles made from a reference line directed in the direction of incident polarized light. The fact that high brightness was obtained in those conditions was confirmed actually from an experimental viewpoint. In particular, among those four conditions of the azimuthal angle, the alignment conditions on azimuthal angles 225 and 315 degrees are greater than the other angles in terms of further improving the contrast. That is, there is no difference in the brightness among the four azimuthal angle conditions in the bright state, but there is a comparatively large difference in the lower level in the dark state. These facts have been confirmed by the inventors. Additionally, when comparing the liquid-crystal alignment conditions in the case of 45 and 135 degrees and in the case of 225 and 315 degrees, the latter conditions on 225 and 315 degrees are superior to the former in terms of the contrast within a range of ±3 degrees.

DETAILED DESCRIPTION OF PREFERRED EMBODIMENTS

Referring to FIGS. 1-12, various embodiments of a projection display apparatus and a three-plate type of liquid crystal projector, both of which are reduced into practice according to the present invention, will now be described.

(First Embodiment)

Referring to FIGS. 1-4, a first embodiment will now be described.

Figure 1:
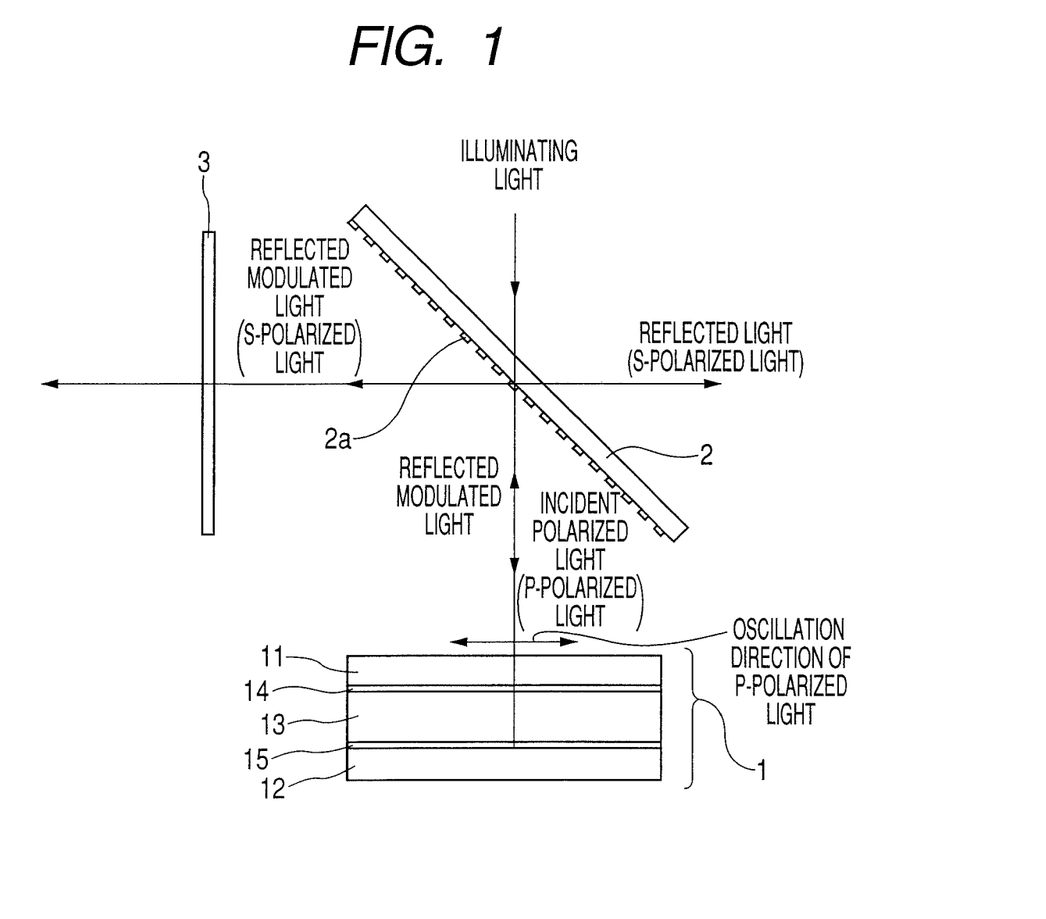
FIG. 1 is an optical schematic diagram showing the essential configuration of a projection display apparatus according to a first embodiment of the present invention.

FIG. 1 shows the essential configuration of a projection display apparatus 100 that serves as a processor for a single-color optical system, the processor composing part of a three-plate type of liquid crystal projector (not shown in FIG. 1) which employs a reflective liquid crystal display device according to the present invention.

As shown in FIG. 1, the projection display apparatus 100 is provided with a reflective liquid crystal display device 1 as stated above, a WG-PBS (wire grid type of polarizing beam splitter) 2, and an analyzer 3 composed of for example a polarization plate.

Of these, the WG-PBS 2 is arranged obliquely at an oblique angle of 45 degrees. The analyzer 3 detects modulated light reflected from the WG-PBS 2. The WG-PBS 2 has a wire grid (WG) 2a which keeps parallelism with the reflective liquid crystal display device 1, so that illuminating light entering the WG-PBS 2 is divided into P-polarized light serving as incident light to the reflective liquid crystal display device 1 and S-polarized light serving as reflected light. After all, the P-polarized light, which is transmitted light, is made to enter the display device 1. This display device 1 modulates the incident P-polarized light according to image signals and the resultant modulated light returns to the WG-PBS 2. This WG-PBS 2 operates to reflect only the modulated S-polarized light, but causes the P-polarized light to be transmitted therethrough so that the P-polarized light becomes return light tracing back the path along which the illuminating light passed.

The modulated S-polarized light, which has been reflected by the WG-PBS 2, passes the analyzer (e.g., polarization plate) 3 to enter a color composing prism (not shown), at which the modulated S-polarized light is composed with other modulated S-polarized light in which the other two colors are reflected. The composed light then enters a projection lens (not shown) for displaying projected color images on a screen.

The reflective liquid crystal display device 1 will now be detailed. This device 1 is provided with a transparent substrate 11 which is a transparent electrode and an active matrix substrate 12 on which both reflective electrodes and drive circuits are mapped in a matrix for respective pixels. Both the substrates 11 and 12 are specially arranged to be opposed to each other. The reflective liquid crystal display device 1 is also provided with a liquid crystal layer (fluid) 13 held in a space sandwiched by both the substrates 11 and 12, and alignment membranes 14 and 15 to provide the liquid crystal with predetermined alignment conditions (i.e., conditions for directing the molecules of the liquid crystal). The alignment membranes 14 and 15 are made from SiOx compound and are formed on surfaces of both the transparent substrate 11 and the active matrix substrate 12, which are exposed to the liquid crystal layer (fluid) 13, by the use of a surface processing technique on vapor deposition.

The liquid crystal layer (fluid) 13 is composed of, for example, nematic liquid crystal having negative dielectric anisotropy, a predetermined double refraction index under the condition that light of a predetermined wavelength is used. The reflective LIQUID CRYSTAL display device 1 is set to be used in a normally black mode.

Figure 2:
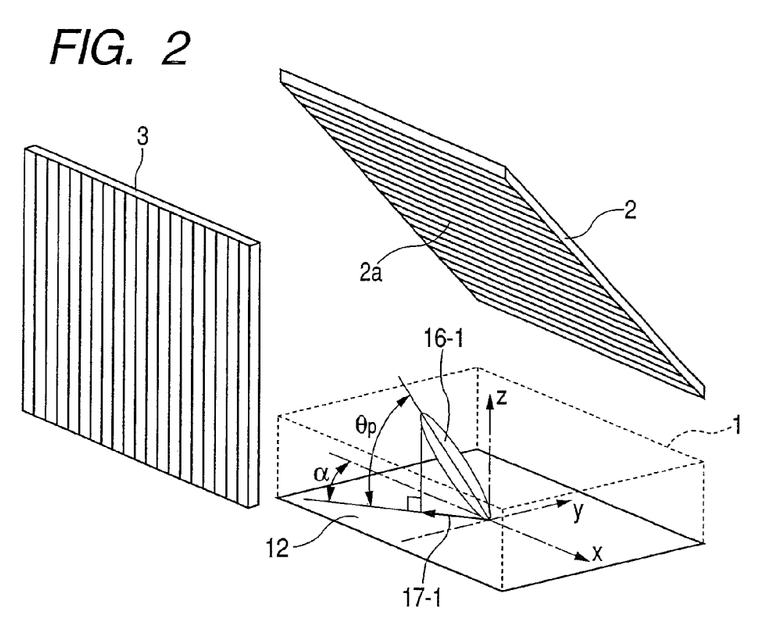
FIG. 2 is a pictorial view explaining a geometrical relationship between an aligned direction of molecules of a liquid crystal layer of a reflective liquid crystal display device and a WG-PBS, both of which are incorporated in the projection display apparatus according to the first embodiment.
Figure 3:
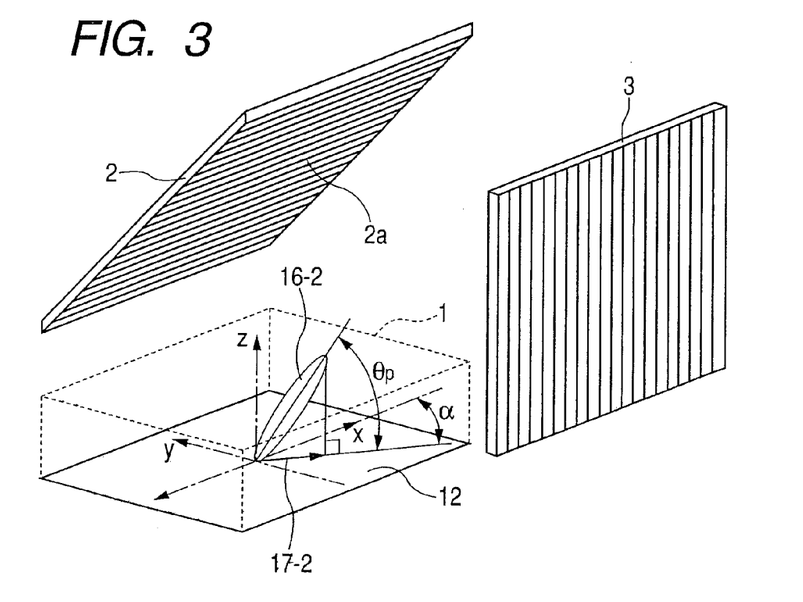
FIG. 3 is another pictorial view explaining a geometrical relationship between an aligned direction of molecules of a liquid crystal layer of a reflective liquid crystal display device and a WG-PBS, both of which are incorporated in the projection display apparatus according to the first embodiment.

In the present embodiment, the liquid crystal layer 13 is given the alignment shown by either FIG. 2 or 3, which is due to the optical geometrical relationship with the WG-PBS 2. The liquid crystal is composed of LIQUID CRYSTAL molecules 16-1 (or 16-2) whose major axes are given a pre-tilt angle θp. Setting this pre-tilt angle θp is made in such a manner that a segment (called a "projected segment") 17-1 (or 17-2) imaginarily formed by projecting the major axis of each liquid crystal molecule 16-1 (or 16-2) onto the active matrix substrate 12 forms an angle of 45 degrees (α=45 degrees) in either the clockwise direction (refer to FIG. 2) or the counterclockwise direction (refer to FIG. 3) in relation to a direction imaginarily formed on the active matrix substrate 12 by perpendicularly projecting the wire grid 2a of the WG-PBS 2 onto the active matrix substrate 12. The wire grid 2a is in parallel with each of the substrates 11 and 12 of the reflective liquid crystal display device 1. In addition, an end of each liquid crystal molecule 16-1 (16-2), which positionally corresponds to one end of each projected segment 17-1 (17-2) which is closer to the active matrix substrate 12, is located nearer to a cross section between a plane including a polarizing separative plane (a plane along which the wire grid 2a is formed) of the WG-PBS 2 and a plane containing the active matrix substrate 2, than the other end of the liquid crystal molecule 16-1 (16-2).

Figure 4:
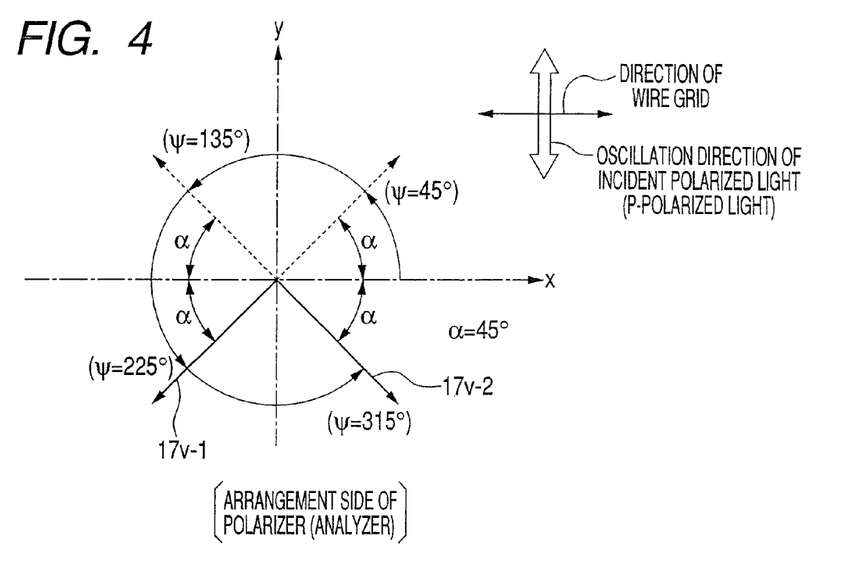
FIG. 4 is an illustration explaining alignment conditions for the molecules of the liquid crystal layer.

The above alignment conditions will now be reviewed from a different aspect. As shown in FIGS. 2 and 3, the orthogonal coordinate system of x, y and z-axes is set to the active matrix substrate 12 to express the projected segment 17-1 (17-2) in vector quantities, which permits each vector 17v-1 or 17v-2 to be expressed on the x-y plane as shown in FIG. 4. An azimuthal angle of each liquid crystal molecule 16-1 or 16-2 can be defined on a counterclockwise angle ψ measured from the x-axis in the geometry shown in FIG. 4. One vector 17v-1 presents an angle ψ of 225 degrees and the other vector 17v-2 presents an angle ψ of 315 degrees.

In general, in the conventional reflective liquid crystal display device, it is known that the liquid crystal molecule alignment that provides a maximum output (brightness) in the bright state is realized in a case where the direction of a segment formed by projecting each liquid crystal molecule onto the substrate and the oscillating direction of the incident polarized light produce an angle of 45 degrees therebetween. In other words, in the case of FIG. 4, four azimuthal angles ψ of 45, 135, 225 and 315 degrees provide the maximum output (brightness) in the bright state. This will be detailed more. As shown in U.S. Pat. No. 4,127,322, for example, the output T from a liquid crystal display device can be expressed by the following formula (1):

$$T = K \cdot \sin^2(2\psi) \cdot \sin^2(\pi \cdot \Delta n_{eff} \cdot d/\lambda) \qquad (1),$$

where K is a constant, ψ is an azimuthal angle, $\Delta n_{eff}$ is an effective double refraction index of liquid crystal molecules, d is a thickness of a liquid crystal cell, and λ is a wavelength of incident polarized light. This formula provides an understanding that the maximum output is obtained at each of the azimuthal angles ψ=45, 135, 225 and 315 degrees.

Hence, as shown in FIG. 1, in the projection display apparatus with the reflective liquid crystal display device 1 and the WG-PBS 2, the molecules of the liquid crystal layer 13 were given a pre-tilt angle θp of 82 degrees and given azimuthal angles ψ of 45, 135, 225 and 315 degrees, respectively. In each of those alignment conditions, the brightness of the outgoing polarized light from the analyzer 3 was measured for contrast ratios in a comparative manner between the bright state (no voltage is applied to the element) and the dark state (predetermined voltage is applied to the element). The resultant measurements are listed in Table 1.

TABLE 1

| Azimuthal angle ψ of LC molecule projected to display device | Brightness in dark state (Lx) | Brightness in bright state (Lx) | Contrast ratio |
|---|---|---|---|
| 45 | 6.24 | 1720 | 276:1 |
| 135 | 6.34 | 1722 | 272:1 |
| 225 | 4.85 | 1720 | 355:1 |
| 315 | 4.78 | 1721 | 360:1 |

In the case of the nematic liquid crystal having negative dielectric anisotropy, no voltage application permits the liquid crystal molecules to stand up at the almost perpendicular angle. Hence the effective double refraction index $\Delta n_{eff}$ of the liquid crystal molecules is smaller, resulting in a smaller optical output In contrast, when a predetermined amount of voltage is applied, the liquid crystal molecules are obliged to tilt into the horizontal direction. The effective double refraction index $\Delta n_{eff}$ of the liquid crystal molecules is thereby larger, so that the optical output becomes larger. Because the cell thickness d is chosen so that the term of "$\sin^2(\pi \cdot \Delta n_{eff} \cdot d/\lambda)$" becomes 1 when an excessive amount of voltage is applied, the brightness decreases adversely in the range of the excessive amounts of voltage higher than the predetermined voltage. Thus applying different amounts of voltage will produce a peak in the brightness. The contrast ratio is given as a ratio between the brightness peak and the dark state. However, since the foregoing formula (1) has the only term "$\sin^2(2\psi)$" that includes the azimuthal angle ψ, the same contrast ratio should be obtained at the foregoing four azimuthal angles ψ of 45, 135, 225 and 315 degrees.

Contrary to the expectation, the brightness in the dark state shows a comparatively large difference between a first case where the azimuthal angle ψ is 45 and 135 degrees and a second case where the azimuthal angle ψ is 225 and 315 degrees, though the brightness in the bright state can be regarded as being kept within an error span of the measurements over the various azimuthal angles ψ. As seen from the measurement results, the azimuthal angles in the second case provide higher contrast ratios than those in the first case and, additionally, differences between the contrast ratios are considerably large. It was also confirmed that the above measurement results were repeatable. That is, it was experimentally tested by replacing the reflective liquid crystal display device 1 by another display device in the frame of the essential structure of the projection display apparatus shown above and the reflective liquid crystal display device 1 is rotated with its attitude kept horizontally. Those tests also revealed that the conditions of the azimuthal angles ψ=225 and 315 degrees provided higher contrast ratios than those in the other conditions, thus no changes giving to the foregoing conclusion.

Further, a comparison was made between a case where minimum contrast ratios obtained when the azimuthal angle ψ is set to a range of 225±3 degrees and a range of 315±3 degrees, respectively, and another case where maximum contrast ratios obtained when the azimuthal angle ψ is set to a range of 45±3 degrees and a range of 135±3 degrees, respectively. This comparison showed that the contrast ratios obtained in the former case were larger than those in the latter case. In the projection display apparatus according to the present embodiment, the maximum contrast ratio can thus be achieved while still keeping the output for the bright state (brightness) larger, provided that the liquid-crystal alignment conditions with the azimuthal angle is within a range of 225±3 degrees and a range of 315±3 degrees, respectively (corresponding to a range of α=45±3 degrees in FIGS. 2 to 4).

In the present embodiment, the projection display apparatus is able to keep not only higher brightness levels in the bright state but also higher contrast of displayed images.

(Second Embodiment)

Referring to FIGS. 5 to 8, a second embodiment of the present invention will now be described.

In the configurations of the second embodiment and subsequent embodiments, the similar or identical components to those in the first embodiment will be given the same reference numerals as those given in the first embodiment and their explanations are simplified or omitted for the sake of simplified explanations.

The second embodiment relates especially to an improvement in contrast due to retardation caused in the plane direction of the liquid crystal layer 13.

Figure 5:
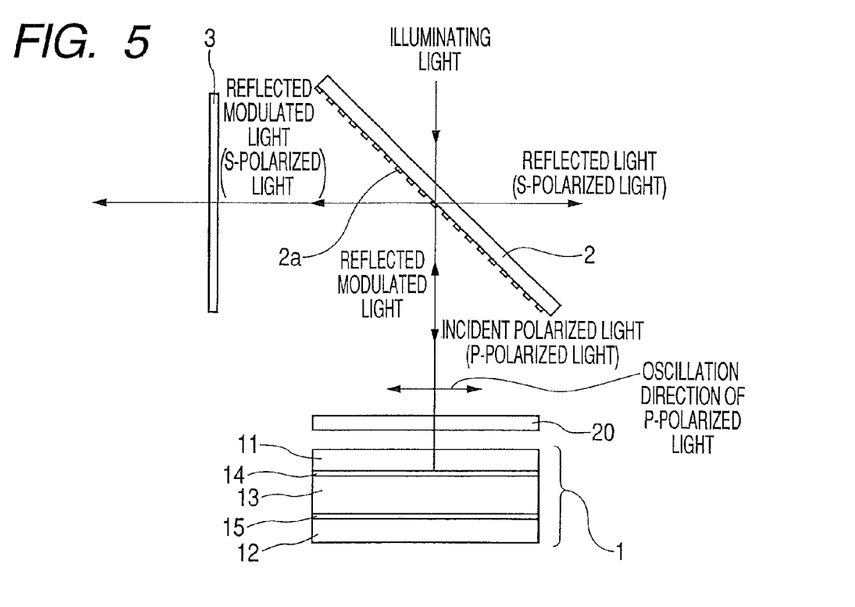
FIG. 5 is an optical schematic diagram showing the essential configuration of a projection display apparatus according to a second embodiment of the present invention.

As shown in FIG. 5, a projection display apparatus according to the second embodiment is provided, as part of its essential configuration, a phase compensator 20, which is composed of a phase compensating plate, is placed to intervene between the reflective liquid crystal display device 1 and the WG-PBS 2. The intervening phase compensator 20 aims at preventing contrast from being lowered, which is caused on account of retardation in the plane direction of the liquid crystal layer 13, and thus raising the contrast further. Accordingly, only the phase compensator 20 is added to the essential configuration shown in FIG. 2, so that the remaining components and configurations are the same as those in the first embodiment.

Figure 6A:
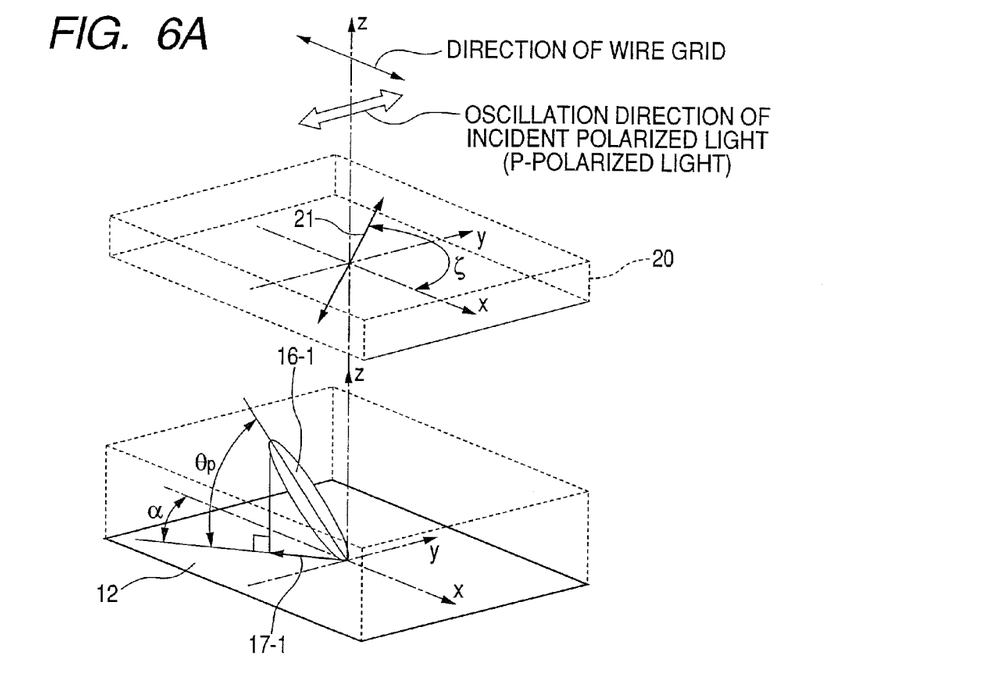
FIG. 6A is a vectorial view explaining a relationship between the alignment of the liquid crystal layer and a direction of a late-phase axis of a phase compensator.
Figure 6B:
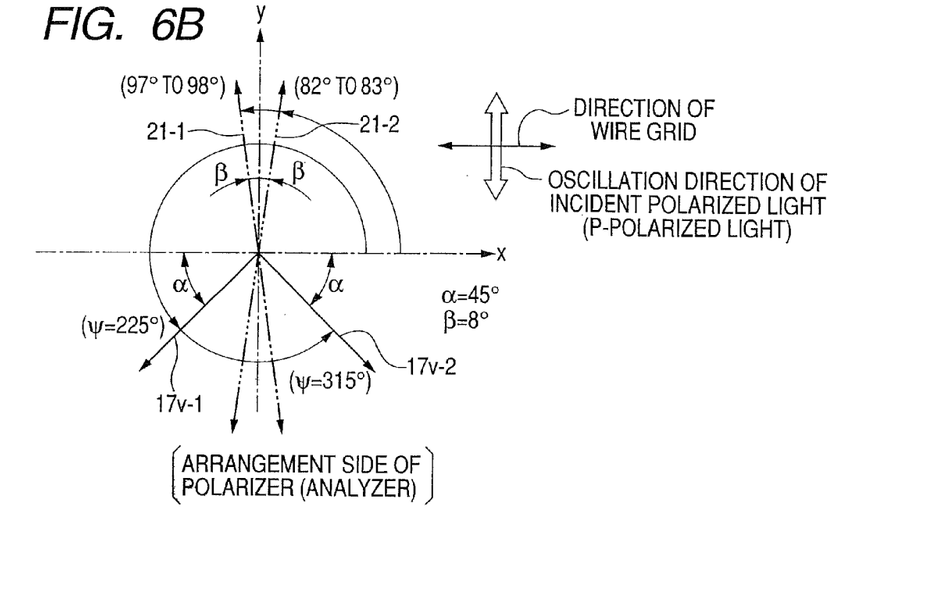
FIG. 6B is a view explaining a relationship between the alignment of the liquid crystal layer and the direction of the late-phase axis of the phase compensator, which is expressed by an x-y coordinate on an active matrix substrate.

FIG. 12A pictorially shows a directional relationship between the alignment of liquid crystal molecules of the liquid crystal layer 13 of the reflective liquid crystal display device 1 and a late-phase axis 21 of the phase compensator 20. In the figure, the x-, y- and z-axes imaginarily given to the phase compensator 20 are identical to those imaginarily set on the active matrix substrate 12 in the first embodiment, except that those x-, y- and z-axes are moved to the position at the phase compensator 20, as shown in FIG. 6A.

In the second embodiment, with green light made to enter the projection display apparatus, an amount of voltage was applied to obtain the dark state, during which time an angle ζ made between the x-axis and the late-phase axis 21 in the x-y plane were changed from 0 to 360 degrees for measurement of the output (i.e., brightness) at each angle ζ. To be specific, in the projection display apparatus according to the second embodiment, the same alignment conditions as those employed in the foregoing first embodiment were given to the reflective liquid crystal display device 1 and a circular disk type of phase compensator (or retarder) whose late-phase axis 21 is set to a predetermined direction is rotatably placed between the reflective liquid crystal display device 1 and the WG-PBS 2. And the phase compensator is rotated to change the angle ζ of the late-phase axis 21, during which measurement was done for the brightness of polarized light outputted from the analyzer 3.

Figure 7:
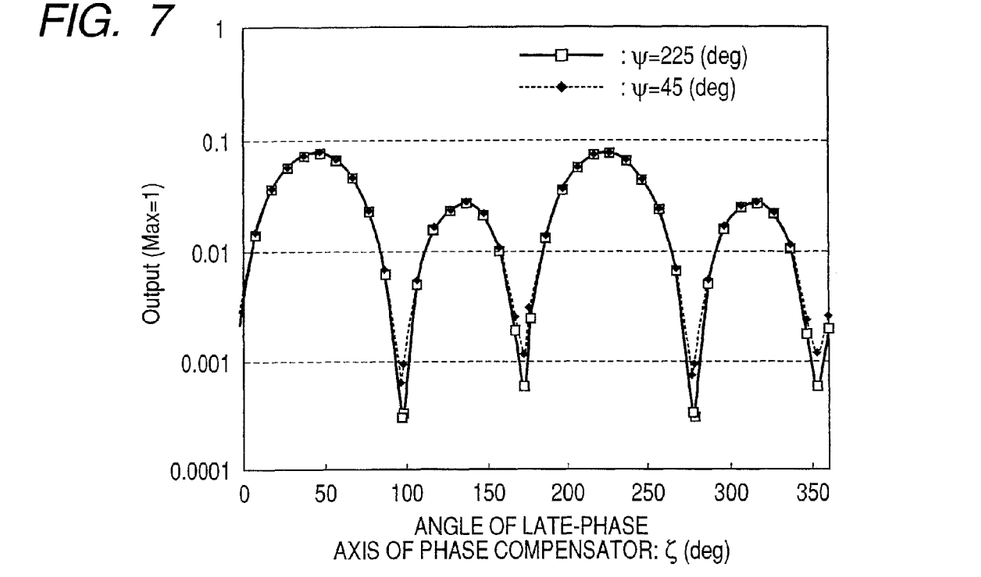
FIGS. 7 and 8 are graphs each showing a relationship between rotational angles of the late-phase axis of the phase compensator in the dark state and outputs (brightness levels)
Figure 8:
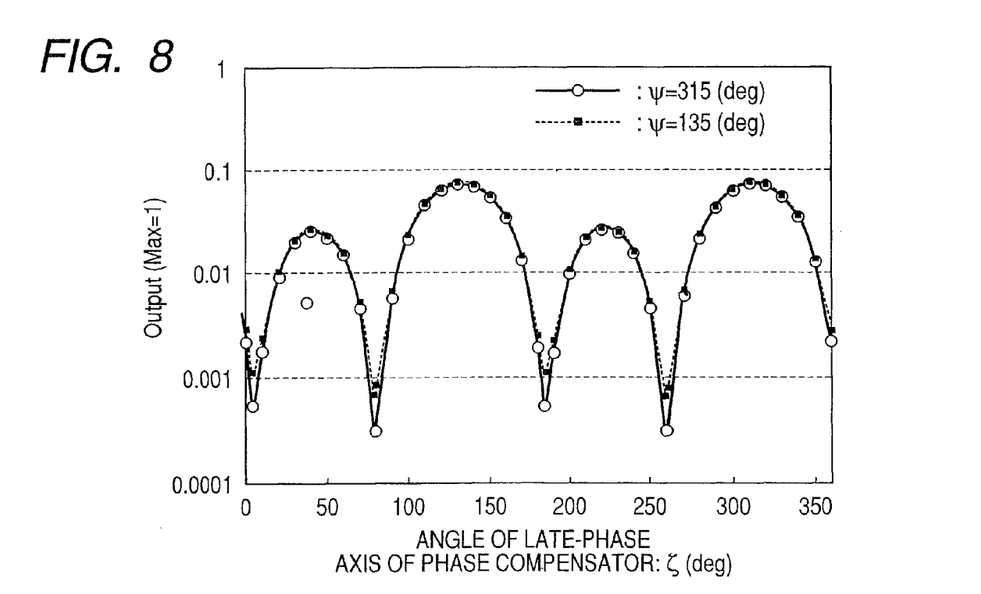

The measurement results are shown in FIGS. 7 and 8. The measurement results for an azimuthal angle ψ=225 degrees of the liquid crystal molecules are shown in FIG. 7, whilst those for an azimuthal angle ψ=315 degrees of the liquid crystal molecules are shown in FIG. 8. Each of FIGS. 7 and 8 are expressed with the use of a scale estimated by setting the maximum brightness (output in each figure) to 1. Incidentally, in the measurements, the pre-tilt angle θp of the liquid crystal molecules was assigned to 82 degrees. In FIGS. 7 and 8, for the purpose of making comparative analysis, the results measured when the azimuthal angle ψ is set to 45 and 135 degrees, respectively.

As clear from each figure, in the case of the azimuthal angle ψ=225 degrees, the brightness was the lowest when the angle ζ of the late-phase axis 21 is in a range of 97-98 degrees and 277-278 degrees (rotated from the 97-98 degrees by 180 degrees), respectively. Further, in the case of the azimuthal angle ψ=315 degrees, the brightness was the lowest when the angle ζ of the late-phase axis 21 is in a range of 82-83 degrees and 262-263 degrees (rotated from the 82-83 degrees by 180 degrees), respectively. Therefore, the azimuthal angles ψ=225 and 315 degrees of the liquid crystal molecules and the angles ζ of the late-phase axis 21 can be summarized two-dimensionally in the x-y coordinate hypothetically set on the active matrix substrate 12, as shown FIG. 6B, wherein an angle β becomes 7-8 degrees.

Another experiment was made as follows. First, as to each of the azimuthal angle ψ=225, 315, 45 and 135 degrees of the liquid crystal molecules, the angles ζ (four angles) of the late-phase axis 21 of the phase compensator 20 were detected as being angles to provide the lowest local minimum values in the brightness, as described in FIGS. 7 and 8. Then, as to three primary colors of red, green and blue, illuminating light is made to enter the apparatus at the detected angles ζ, respectively, for estimating contrast ratios. This resulted in the estimation listed in Table 2. In this table, the contrast ratios are denoted such that if a contrast ratio is equal to or less than 1500:1, the estimation is given by a marking x; if larger than 1500:1 but equal to or less than 1800:1, by a marking Δ; if larger than 1800:1 but equal to or less than 2200:1, by a marking o; and if larger than 2200:1, by a marking ⊕.

of the liquid crystal layer 13 can be avoided surely, as long as the angle ζ of the late-phase axis 21 of the phase compensator 20 is set to a value within a range of 93-103 degrees or a range of 77-87 degrees (i.e., within a range of ±5 degrees). Hence, it was found that such a setting provides further raises the contrast.

As described, the foregoing experiment was made by using the circular disk type of phase compensator as the phase compensator 20. Meanwhile, the pixel arrangement area of the reflective liquid crystal display device 1 is frequently formed into a rectangle whose major edges are in parallel with the direction of the wire grids of the WG-PBS 2. Practically, the phase compensator 20 is frequently formed as a rectangle having a planar area larger a little than the pixel arrangement area. The phase compensator 20 has a retardation of some 5-15 nm in the plane direction. With considering these situations, the retardation in the plane direction of the phase compensator 20 is set to 20±5 nm. And in cases where the liquid crystal molecules of the liquid crystal as layer 13 are set to have an azimuthal angle ψ of 225±3 degrees, the late-phase axis 21 is set to a direction apart from a minor axis of the rectangle by 3-13 degrees in the counterclockwise direction around the minor axis. In cases where the liquid crystal layer 13 are set to have an azimuthal angle ψ of 315±3 degrees, the late-phase axis 21 is set to a direction apart from the minor axis of the rectangle by 3-13 degrees in the clockwise direction around the minor axis.

The above setting is based on the following reason. In a case where the phase compensator 20 is formed to have a

TABLE 2

| | LC cell | | | Phase compensator | | Contrast ratio | | |
| --- | --- | --- | --- | --- | --- | --- | --- | --- |
| | Cell thickness (um) | Pre-tilt angle (degrees) | Azimuthal angles (degrees) | Retardance (nm) | Optical axis (Late-phase axis) (degrees) | Blue light | Green light | Red light |
| 1 | 3 | 82 | 225 | 15 | 97 | ⊕ | ⊕ | ⊕ |
| 2 | | | | | 173 | Δ | ○ | ⊕ |
| 3 | | | | | 277 | ⊕ | ⊕ | ⊕ |
| 4 | | | | | 353 | Δ | ○ | ⊕ |
| 5 | | | 315 | | 7 | Δ | ○ | ⊕ |
| 6 | | | | | 83 | ⊕ | ⊕ | ⊕ |
| 7 | | | | | 187 | Δ | ○ | ⊕ |
| 8 | | | | | 263 | ⊕ | ⊕ | ⊕ |
| 9 | | | 45 | | 97 | Δ | ○ | ⊕ |
| 10 | | | | | 173 | X | Δ | ⊕ |
| 11 | | | | | 277 | Δ | ○ | ⊕ |
| 12 | | | | | 353 | X | Δ | ⊕ |
| 13 | | | 135 | | 7 | X | Δ | ⊕ |
| 14 | | | | | 83 | Δ | ○ | ⊕ |
| 15 | | | | | 187 | X | Δ | ⊕ |
| 16 | | | | | 263 | Δ | ○ | ⊕ |

As shown in Table 2, in the case of the liquid crystal molecules having an azimuthal angle ψ of 225 degrees, the angle ζ of the late-phase angle 21 of the phase compensator 20 is set to 97 degrees (optically, also equivalent to an angle ζ=277 degrees). And in the case of in the case of the liquid crystal molecules having an azimuthal angle ψ of 315 degrees, the angle ζ of the late-phase angle 21 of the phase compensator 20 is set to 83 degrees (optically, also equivalent to an angle ζ=263 degrees). Table 2 clearly teaches that both cases provide higher contrast ratios for all the incident light of red, green and blue. Various experiments conducted by the inventors also revealed that, when the azimuthal angle ψ of the liquid crystal molecules is set to a value within a range of 225±3 degrees or a range of 315±3 degrees, a decrease in the contrast which is due to the retardation in the plane direction retardation less than 15 nm in the plane direction thereof, a rotation adjusting angle becomes too wide, resulting in that the size of the phase compensator 20 should be larger. To the contrary, the retardation is larger than 25 nm, it will be difficult to give high accuracy to the rotation adjusting angle, leading to a decrease in the contras. As to the angular conditions of the late-phase axis 21, as long as the phase compensator 20 has a size that almost corresponds to the pixel arrangement area of the reflective liquid crystal display device 1, the late-phase axis 21 can be set to optimum directions as shown in FIG. 5B.

In the second embodiment, when actually installing the phase compensator into the projection display apparatus, the phase compensator can be made compact and adjusted easily.

(Third Embodiment)

Referring to FIGS. 9 to 12, a second embodiment of the present invention will now be described.

The third embodiment relates to a three-plate type of liquid crystal projector capable of displaying color images with contrast as high as possible by adopting the projection display apparatus described in either the first or second embodiment.

Figure 9:
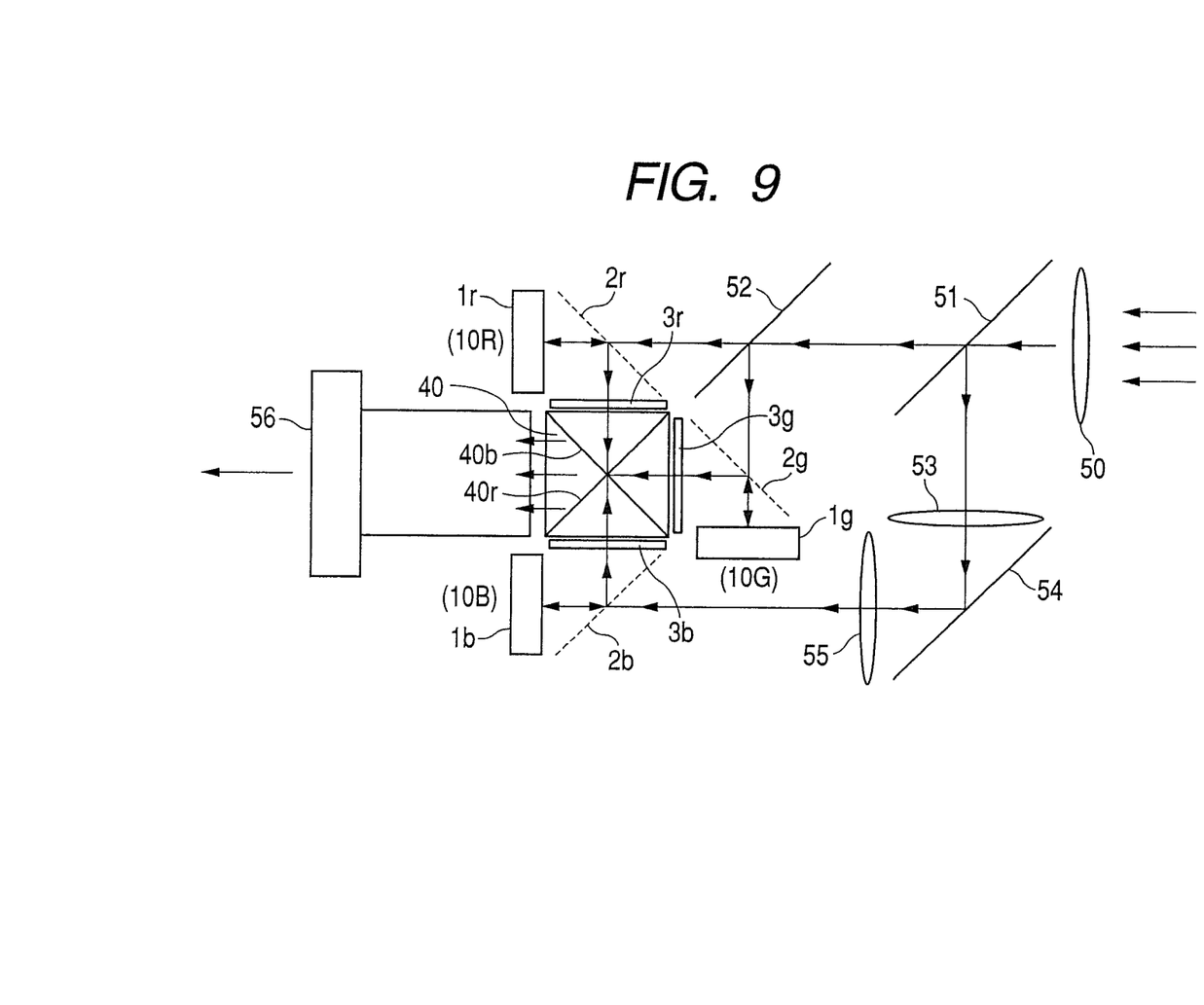
FIG. 9 is an optical schematic diagram showing the essential configuration of a three-plate type of liquid crystal projector according to a third embodiment of the present invention.

The essential configuration of this three-plate type of liquid crystal projector is basically the same as that shown in FIG. 9, except for configurations necessary for composing colors. Such color-composing configurations include a color composing prism 40 having three planes serving as incident planes. To be opposed to the three incident planes, projection display apparatuses 10R, 10G and 10B are arranged, respectively, each of which function as a processor processing each of single-color light beams of red (R), green (G) and blue (B). Inside the color composing prism 40, there are provided an optical multiple layer 40r allowing only red light to be reflected therefrom but green and blue light to be transmitted therethrough and an optical multiple layer 40b allowing only blue light to be reflected therefrom but green and red light to be transmitted therethrough. Both optical multiple layers 40r and 40b are arranged to intersect with each other at an intersection angle of 90 degrees.

In each of the projection display apparatuses 10R, 10G and 10B, illuminating light of each color guided in parallel with each incident plane of the color composing prism 40 transmits each of the WG-PBS 2r, 2b and 2g to become p-polarized light entering each of the reflective liquid crystal display devices 1r, 1b and 1g. Reflected modulated light from each of the display devices 1r, 1b and 1g returns to each of the WG-PBS 2r, 2b and 2g where s-polarized light of the modulated light is reflected. The reflected light from each of the WG-PBS 2r, 2b and 2g enters each incident plane of the color composing prism 40 via each of the analyzers 3r, 3b and 3g. Accordingly, the modulated light beams of red, green and blue are able to come to the respective incident planes of the prism 40. In the prism 40, the red modulated light and blue modulated light are reflected by the optical multiple layers 40r and 40b, but the green modulated light transmits those layers 40r and 40b, so that modulated light beams of red, green and blue are composed to be outputted into a projection optical system.

There are additionally provided lenses 50 receiving illumination light emanate from an optical source lamp (not shown), 53 and 55 and a dichroic mirror 51 to allow only blue light to be reflected therefrom and allow red and green light to be transmitted therethrough, a further dichroic mirror 52 to allow only green light to be reflected therefrom and allow red light to be transmitted therethrough, and an ordinary mirror 54. The optical systems 50-55, which are for decomposing the illuminating light into light beams of colors and guiding those light beams, are arranged to make each single-color light beam enter each of the projection display apparatuses 10R, 10G and 10B. The light that has entered each projection display apparatus 10R (10G and 10B) experiences modulation on image signals and the modulated light for each color returns to the color composing prism 40 for the composition therein. The resultant composed light is projected to a screen (not shown) as color images by a projecting optical system 56.

Figure 10:
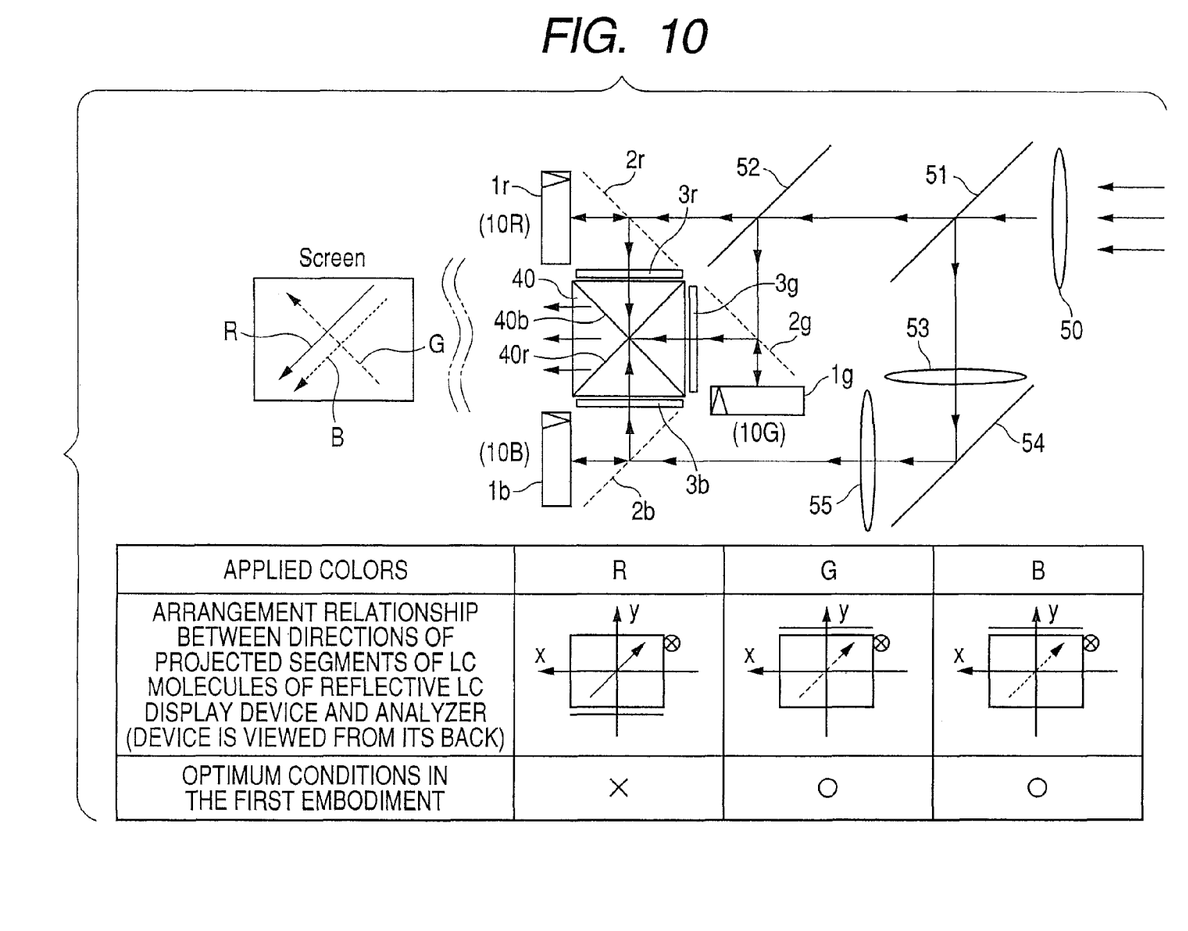
FIG. 10 is an optical path view and an illustration according to a three-type of liquid crystal projector according to a comparative example.

Now assume that a three-plate type of liquid crystal projector shown in FIG. 10 is provided, where the projection display apparatuses 10R, 10G and 10B are provided a reflective liquid crystal display devices 1r, 1b and 1g, respectively. As shown, these elements accompany a triangular mark "Δ" which is attached conveniently and shows the front and back of each display device 1r (1b and 1g) in a distinguishable manner. In addition, FIG. 10 includes a table on the lower side, which contains illustrations showing a plan view of the reflective liquid crystal display devices 1r, 1b and 1g obtained when viewing the back of each element. Each element includes a segment depicted as a macroscopic vector showing liquid crystal molecules projected onto the active matrix substrate 12. Further, the attachment direction of each of the whole display device 1r, 1b and 1g is displayed with the use of the position corresponding to the foregoing mark and the position of the analyzer 3. In the case of the three-plate type of liquid crystal projector, all the reflective liquid crystal display devices 1r, 1b and 1g are manufactured under the same liquid crystal alignment conditions when viewed in terms of how the marks are denoted. Hence, in this regard, as concerning the three-plate type of liquid crystal projectors, it is sufficient that the reflective liquid crystal display devices are manufactured based on only one type of specifications.

Therefore, the manufacturing and assembling steps and parts management can be simplified and yield ratio can also be improved.

When the segments of the liquid crystal molecules of the reflective liquid crystal liquid crystal display devices 1r, 1b and 1g in the projection display apparatuses 10R, 10G and 10B are projected on a screen via the color composing prism 40, the segments from the projection display apparatuses 10R and 10B are directed in the same direction. However, the segments from the residual projection display apparatus 10G is directed in a direction different by 90 degrees. Further, as to the projection display apparatus 10R, the foregoing optimum conditions described in the first embodiment cannot be met. In this case, when there are differences in the directions of the segments projected on the screen, projected images include oblique lines to be displayed with colors different from their inherent colors, lowering quality in displaying images. Hence, the contrast of a color that does not meet the optimum conditions described in the first embodiment is decreased.

To overcome this difficulty, the present embodiment employs the projection display apparatus 10R arranged under a condition as shown in FIG. 11. Specifically, the reflective liquid crystal display device 1r placed in the projection display apparatus 10R is rotated by 180 degrees from the state shown in FIG. 10 so as to meet the optimum conditions described in the first embodiment. In other words, the projection display apparatuses 10R and 10B each receiving modulated light of colors reflected by the optical multiple layers 40r and 40b of the color composing prism 40 are optically arranged to have a relationship of being mutually rotated by 180 degrees about the outgoing optical axis of the color composing prism 40. Although it is impossible for the arrangement condition shown in FIG. 11 to make the projected segments on the screen direct in the same direction, unlike those in FIG. 10, there is an advantage in their manufacturing. That is, it is sufficient to manufacture reflective liquid crystal display devices in accordance with only one type of specifications. Hence all the projection display apparatuses 10R, 10G and 10B are able to meet the optimum conditions described in the first embodiment, thereby making it possible to display images with higher contrast and better balance among the three primary colors.

Figure 12:
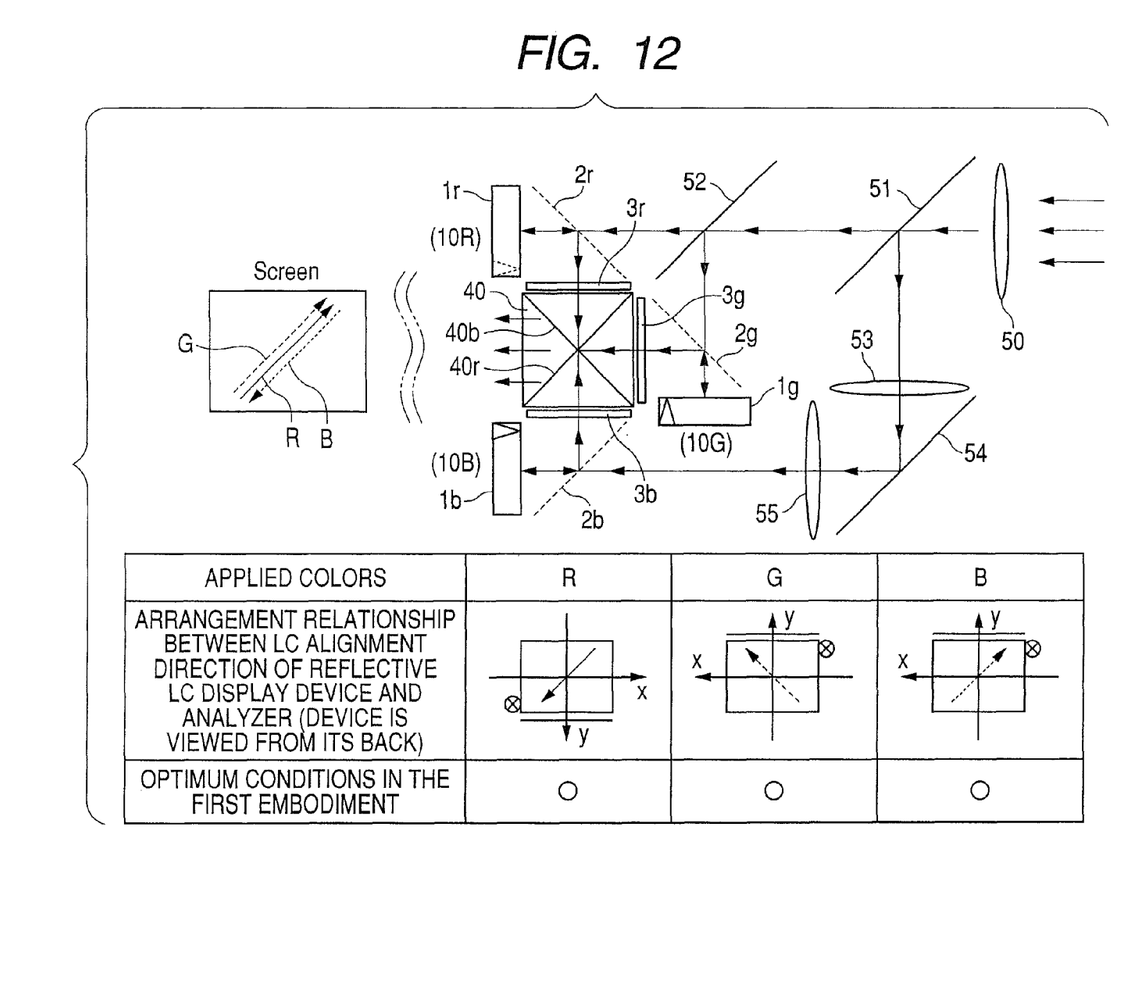
FIG. 12 is an optical path view and an illustration according to a modified example of the three-type of liquid crystal projector according to the third embodiment.

Furthermore, as the reflective liquid crystal display device 1g of the projection display apparatus 10G in FIG. 11, a device whose liquid crystal molecules provide projected segments having a direction different by 90 degrees may still be employed. In this case, as shown in FIG. 12, as for the three primary colors, the directions of all segments projected onto the screen can be directed in the same one way. Hence it is possible to avoid a difficult situation where, as explained above, projected images include oblique lines being displayed with a color different from its inherent ones, thereby increasing image quality.

Instead of enjoying such an advantage, two types of reflective liquid crystal display apparatuses according to two types of specifications should be manufactured. Even so, the projection display apparatuses 10R and 10B and the projection display apparatus 10G can be selected to meet the two types of alignment conditions which are regarded as optimum ones in the first embodiment. Accordingly, like the case described in FIG. 10, better balanced and higher contrast images can be displayed as to the three primary colors.

The present invention may be embodied in several other forms without departing from the spirit thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A projection type of display apparatus, comprising:
a reflective liquid crystal display device;
a polarizing beam splitter;
a phase compensator arranged between the reflective liquid crystal display device and the polarizing beam splitter; and
an analyzer,
wherein
the reflective liquid crystal display device comprises
a first substrate having a surface on which an optically-transparent electrode is formed,
a second substrate having a surface on which pixel electrodes are formed, and
a liquid crystal layer composed of nematic liquid crystal having negative dielectric anisotropy and held in a space between the first and second substrates, the liquid crystal being given a pre-tilt angle;
wherein the polarizing beam splitter is arranged on the first substrate to be oblique thereto such that the polarizing beam splitter allows only a first polarized light component of incident illuminating light to be transmitted therethrough and to perpendicularly enter the reflective liquid crystal display device and allows only a second polarized light component of reflected modulated light emitted from the reflective liquid crystal device to be reflected therefrom, the first and second polarized light components being polarized oppositely in a polarization direction to each other;
the analyzer is configured to remove unnecessary components from the second polarized light component to produce light to be projected from the projector;
the nematic liquid crystal includes liquid crystal molecules pre-tilted obliquely to an analyzer side, wherein the pre-tilt provides the molecules with an alignment direction falling into an angle range of 42 to 48 degrees in relation to an oscillation direction of the first polarized light component; and
the phase compensator is set to have a retardation of 15 to 20 nm.

2. A projection type of display apparatus, comprising:
a plurality of image producing sections configured to produce light images responding to red, green and blue light components;
a synthesis section configured to synthesize the light images; and
a projection section configured to project the synthesized light images to a screen,
wherein
each of the image producing sections comprises,
a reflective liquid crystal display device,
a polarizing beam splitter of wire grid type,
a phase compensator arranged between the reflective liquid crystal display device and the polarizing beam splitter of wire grid type, and
an analyzer,
wherein
the reflective liquid crystal display device comprises
a first substrate having a surface on which an optically-transparent electrode is formed,
a second substrate having a surface on which pixel electrodes are formed,
a liquid crystal layer composed of nematic liquid crystal having negative dielectric anisotropy and held in a space between the first and second substrates, the liquid crystal being given a pre-tilt angle;
wherein
the polarizing beam splitter is arranged on the first substrate to be oblique thereto such that the polarizing beam splitter allows only a first polarized light component of incident illuminating light to be transmitted therethrough and to perpendicularly enter the reflective liquid crystal display device and allows only a second polarized light component of reflected modulated light emitted from the reflective liquid crystal device to be reflected therefrom, the first and second polarized light components being polarized oppositely in a polarization direction to each other;
the analyzer is arranged to receive the second polarized light from the polarizing beam splitter and is configured to remove unnecessary components from the second polarized light component to produce light to be projected from the projector to the screen;
the nematic liquid crystal includes liquid crystal molecules pre-tilted obliquely to an analyzer side, wherein the pre-tilt provides the molecules with an alignment direction falling into an angle range of 42 to 48 degrees in relation to an oscillation direction of the first polarized light component; and
the phase compensator is set to have a retardation of 15 to 20 nm;
wherein the liquid crystal layers of the reflective liquid crystal display devices for the red, green and blue light components are configured to have the same alignment conditions of the liquid crystal molecules.

3. The display apparatus of claim 2, wherein
the alignment directions of the pre-tilted liquid crystal molecules for the red, green and blue light components fall into the range of 42 to 48 degrees in either a clockwise direction or a counterclockwise direction when the alignment direction on the analyzer side is defined as a positive alignment direction in relation to the oscillation direction of the first polarized light component, and the alignment direction for one of the red, green and blue light components differs from the alignment directions for the others of the red, green and blue light components on the screen.

4. The display apparatus of claim 2, wherein
the alignment direction of the pre-tilted liquid crystal molecules for the red light component falls into the range of 42 to 48 degrees in a clockwise direction and the alignment direction of the pre-tilted liquid crystal molecules for the green light component falls into the range of 42 to 48 degrees in a counterclockwise direction, when the alignment direction on the analyzer side is defined as a positive alignment direction in relation to the oscillation direction of the first polarized light component, and
the alignment direction for the blue light component differs from the alignment directions for the red and green light components on the screen.

5. The display apparatus of claim 2, wherein
the alignment direction of the pre-tilted liquid crystal molecules for the red light component falls into the range of 42 to 48 degrees in a counter clockwise direction and the alignment direction of the pre-tilted liquid crystal molecules for the green light component falls into the range of 42 to 48 degrees in a clockwise direction, when the alignment direction on the analyzer side is defined as a positive alignment direction in relation to the oscillation direction of the first polarized light component, and
the alignment direction for the blue light component differs from the alignment directions for the red and green light components on the screen.

* * * * *